US012218981B2

(12) United States Patent
Williams

(10) Patent No.: US 12,218,981 B2
(45) Date of Patent: *Feb. 4, 2025

(54) SECURE REQUEST AUTHENTICATION FOR A THREAT PROTECTION SERVICE

(71) Applicant: Akamai Technologies, Inc., Cambridge, MA (US)

(72) Inventor: Brandon O. Williams, Revere, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,024

(22) Filed: Jan. 10, 2023

(65) Prior Publication Data
US 2023/0164191 A1 May 25, 2023

Related U.S. Application Data

(63) Continuation of application No. 16/267,587, filed on Feb. 5, 2019, now Pat. No. 11,552,997.
(Continued)

(51) Int. Cl.
*H04L 9/40* (2022.01)
*H04L 9/08* (2006.01)
(Continued)

(52) U.S. Cl.
CPC ............ *H04L 63/20* (2013.01); *H04L 9/0891* (2013.01); *H04L 9/3234* (2013.01);
(Continued)

(58) Field of Classification Search
None
See application file for complete search history.

(56) References Cited

U.S. PATENT DOCUMENTS 7,299,291 B1 * 11/2007 Shaw .................. H04L 67/1001
709/227
2013/0167253 A1 * 6/2013 Seleznev ................ G06F 21/10
726/29
(Continued)

FOREIGN PATENT DOCUMENTS

AU 2015202661 A1 * 6/2015 ............. H04L 63/08

*Primary Examiner* — Daniel B Potratz
*Assistant Examiner* — Mayasa A. Shaawat
(74) *Attorney, Agent, or Firm* — David H. Judson

(57) ABSTRACT

A client application sends DNS requests to a threat protection service when a mobile device operating the client application is operating off-network. The application is configured to detect network conditions and automatically configure an appropriate system-wide DNS resolution setting. Preferably, DNS requests from the client identify the customer and the device to threat protection (TP) service resolvers without introducing a publicly-visible customer or device identifier to the DNS requests or responses. The TP system then applies the correct policy to DNS requests coming from off-network clients. In particular, the resolver recognizes the customer for requests coming for off net clients and apply the customer's policy to such request. The resolver is configured to log the customer and the device associated with requests from the TP off-net client. Request logs from the TP resolver are provided to a cloud security intelligence platform for threat intelligence analytics and customer visible reporting.

10 Claims, 8 Drawing Sheets

Related U.S. Application Data

(60) Provisional application No. 62/626,852, filed on Feb. 6, 2018.

(51) Int. Cl.
    *H04L 9/32*       (2006.01)
    *H04L 61/4511*   (2022.01)
    *H04W 12/37*     (2021.01)

(52) U.S. Cl.
    CPC ........ *H04L 9/3247* (2013.01); *H04L 61/4511* (2022.05); *H04L 63/0281* (2013.01); *H04W 12/37* (2021.01)

(56) References Cited

U.S. PATENT DOCUMENTS

| | | | |
|---|---|---|---|
| 2014/0189808 A1* | 7/2014 | Mahaffey | G06F 21/31 |
| | | | 726/4 |
| 2018/0006821 A1* | 1/2018 | Kinagi | G06Q 20/4015 |

* cited by examiner

```
POST /etponcapi/v1/register HTTP/1.1
Host: <API server hostname>
Content-Type: application/json {
   customer_id:<custid>,
   software_version:<version>,
   entitlement:<entitlement code>,
   timestamp:<timestamp>,
   device_name:<hostname>,
   mac_addr:<mac address>,
   user_id:<user ID>
}
```

FIG. 3

```
POST /etponcapi/v1/authorize? HTTP/1.1
Host: <API server hostname>
Content-Type: application/json {
      customer_id:<custid>,
      device_id: <uuid>,
      software_version:<version>,
      config_version:<version>,
      kid:<key id>,
      nonce:<random nonce>,
      icv:<HMAC-SHA-256>
}
```

FIG. 5

```
HTTP/1.1 200 OK
Content-Type: application/json
Cache-Control: no-store
Pragma: no-cache {
   "device_id": <uuid>,
   "key_id": <kid>,
   "key_type": "hmac_sha_256",
   "key": "<key>"
}
```

FIG. 4

```
POST /etponcapi/v1/authorize? HTTP/1.1
Host: <API server hostname>
Content-Type: application/json {
      customer_id:<custid>,
      device_id: <uuid>,
      software_version:<version>,
      config_version:<version>,
      kid:<key id>,
      nonce:<random nonce>,
      icv:<HMAC-SHA-256>
}
```

FIG. 6

```
struct {
        uint8_t token_format;
        uint8_t unused;
    uint8_t hmac_kid;
    uint8_t enc_kid;
    uint32_t timestamp;
    uint32_t custid;
    cypher_block = {
        uint8_t iv[16];
            encrypted_uuid = {
            uint8_t uuid[16];
          uint8_t nul_padding[ ];
                };
    };
    uint8_t hmac[16];
```

FIG. 7

```
HTTP/1.1 200 OK
Content-Type: application/json
Cache-Control: no-store
Pragma: no-cache {
  "expires_in": "xxxx",
  "auth_token": "ASNFZ...ze      ...SN Z 4m..."
}
```

FIG. 8

```
POST /etponcapi/v1/register HTTP/1.1
Host: <API server hostname>

Content-Type: application/json

{
   customer_id:<custid>,
   device_id:<uuid>,
   software_version:<version>,
   config_version:<version>,
   kid:<key id>,
   nonce:<random nonce>,
   icv:<HMAC-SHA-256>
   }
```

FIG. 9

```
HTTP/1.1 200 OK
Content-Type: application/json
Cache-Control: no-store
Pragma: no-cache {
   "version": "<version ID string>",
   "dns_hosts_v4": [ "<TPanycast IPv4 VIP>", "<TPanycast IPv4 VIP>" ],
   "dns_hosts_v6": [ "<TPanycast IPv6 VIP>", "<TPanycast IPv6 VIP>" ],
   "dns_test": "<customer DNS test domain>",
   "products": "<list of service provider product designators>",
   "http_test": "<HTTP test object URI>",
   "dns_proxy": "(enable | disable)",
   "user_control": "(enable | disable)"
}
```

FIG. 10

```
POST /etponcapi/v1/rotatekey HTTP/1.1
Host:  <API server hostname>
Content-Type:  application/json {
  customer_id:<custid>,
  device_id:<uuid>,
  software_version:<version>,
  config_version:<version>,
  kid:<key id>,
  nonce:<random nonce>,
  icv:<HMAC-SHA-256>  HTTP/1.1
}
```

FIG. 11

```
HTTP/1.1 200 OK
Content-Type: application/json
Cache-Control: no-store
Pragma: no-cache {
  "key_id": "<key id>",
  "key_type": "hmac_sha_256",
  "key": "<key>"
}
```

FIG. 12

SECURE REQUEST AUTHENTICATION FOR A THREAT PROTECTION SERVICE

BACKGROUND

Technical Field

This application relates generally to techniques to protect enterprise data traffic against attack.

Brief Description of the Related Art

Enterprise traffic is targeted by malicious actors for various attacks. These include phishing, malware, command & control (CNC) servers, etc. Also, users within the enterprise may access sites (e.g., gambling, adult) that the company deems inappropriate, risky, or time-wasting (e.g. social). One way to protect the organization from these is to use a Secure Web Gateway (SWG). SWGs, however, only protect web traffic (HTTP/HTTPS), and they incur an overhead over each request. On-premises SWGs also do not offer protection for roaming users, unless they are tunneled through VPN to the SWG, which adds even more overhead.

It is known to provide threat protection (TP) for an enterprise, where the threat protection is configured as a cloud-based recursive Domain Name System (DNS) service that can mitigate threats in the DNS resolution stage. One such cloud-based service is AnswerX™ (available from Akamai Technologies, Inc., of Cambridge, Massachusetts). Instead of returning the real Internet Protocol (IP) address for a malicious domain, the threat protection service can return NXDOMAIN (non-existent domain), REFUSED, an alternate IP, or resolve an alternative name (redirect to another domain). Using an associated cloud-based security intelligence infrastructure for big data processing, malicious domains or IPs can be detected offline, e.g., by looking at behavioral profiles of the traffic and external data, and flagged to the customer, or sent to the DNS for subsequent mitigation.

A service of this type is primarily targeted at fixed-site deployments (enterprise data centers, offices, and branches) where the customer-controlled network is configured to use TP recursive resolvers. This can be accomplished by directly configuring devices to use the TP resolvers, or by configuring internal corporate resolvers to use the TP resolvers when resolving names for non-corporate domains. Such configurations then impact name resolution for all on-net devices that respect the local resolver configuration. However, when a mobile user with a corporate laptop connects to the Internet using a third party network—e.g., a coffee shop, conference center, or customer site-he or she must either tunnel all DNS requests back to the corporate network over a VPN or lose the benefit of TP's mitigations.

The ability to route mobile users' off-network traffic ("off-net") to the TP platform for DNS resolution is desirable.

BRIEF SUMMARY

The technique herein provides for a client application to manage a resolver configuration and send DNS requests to a threat protection service when a mobile device operating the client application is operating off-network. The client application is configured to detect network conditions and automatically configure an appropriate system-wide DNS resolution setting for various operating scenarios, e.g.: when on the customer's corporate network (including VPN), send DNS requests to the customer's corporate resolver; when off the customer's corporate network (including cases where the client is on the corporate network of a different TP customer), send DNS requests to TP; when on a network that requires use of the local DNS recursive resolver (e.g., some captive portal architectures), either fail or use the local resolver, based on the customer configuration; and when on a network that requires use of the local DNS recursive resolver only for initial network registration, switch from the local resolver to TP after registration is complete. Preferably, DNS requests from the client identify the customer and the device to the TP resolvers without introducing a publicly-visible customer or device identifier to the DNS requests or responses. The TP system then applies the correct policy to DNS requests coming from off-network clients. In particular, the TP resolvers must recognize the customer for requests coming for off net clients and apply the customer's policy to such request. These resolvers are also configured to log the customer and the device associated with requests from the TP off-net client. Preferably, request logs from the TP resolvers are provided to a cloud security intelligence platform for threat intelligence analytics and customer visible reporting.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 3 depicts a representative TP client registration API request;

FIG. 4 depicts a representative API server response to the TP client registration API request depicted in FIG. 3;

FIG. 5 depicts a representative TP client API authentication request;

FIG. 6 depicts a representative authorization API request;

FIG. 7 depicts a representative authorization token generated by the TP client API server after validating the request depicted in FIG. 6;

FIG. 8 depicts a representative API server response that includes the authorization token depicted in FIG. 7;

FIG. 9 depicts a representative configuration API request from a TP client;

FIG. 10 depicts a representative response to the configuration API request depicted in FIG. 9;

FIG. 11 depicts a representative key rotation API request from a TP client;

FIG. 12 depicts a representative response to the key rotation API request depicted in FIG. 11;

DETAILED DESCRIPTION

The following is a glossary of relevant terms used herein.

Figure 1:
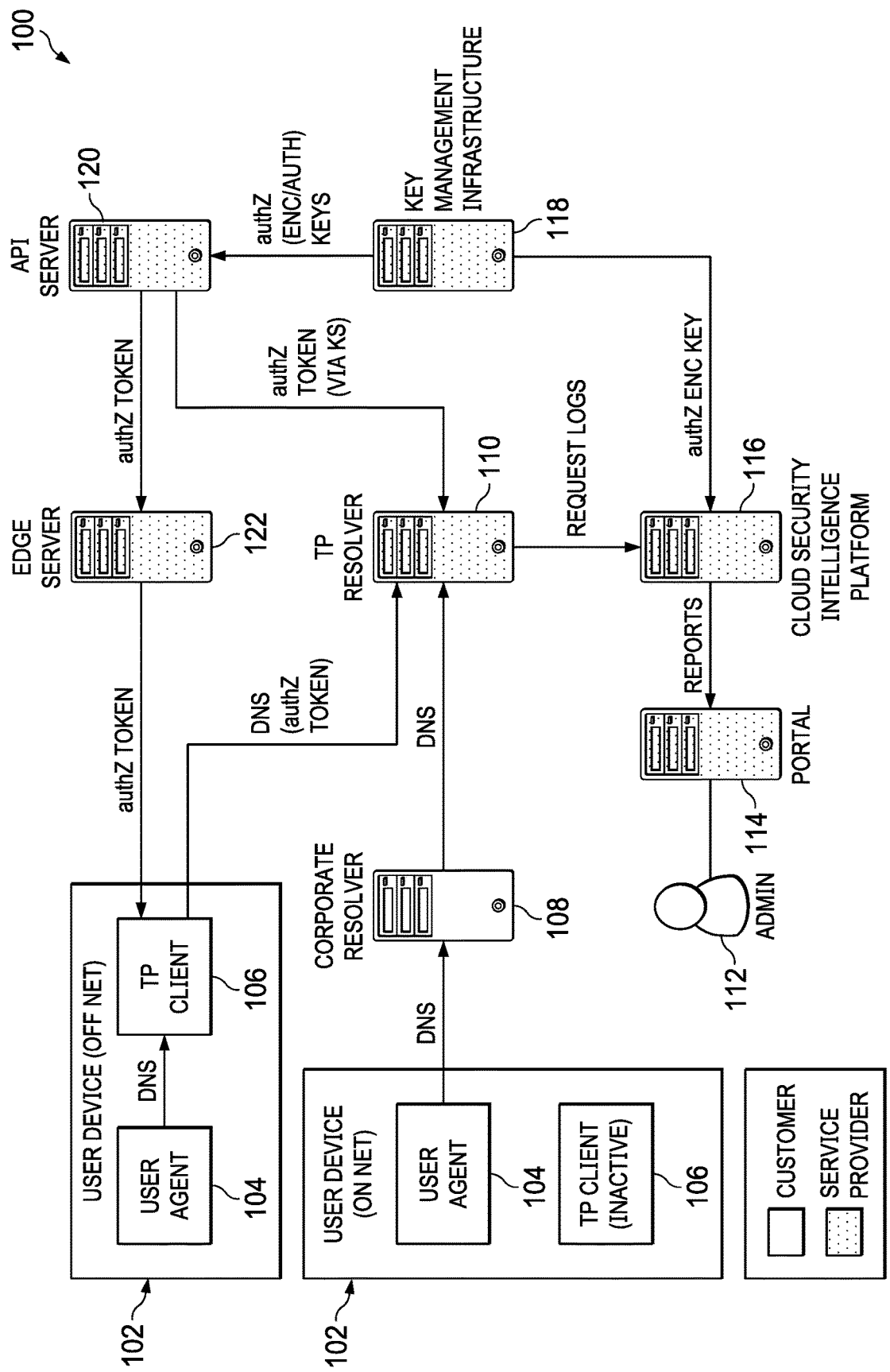
FIG. 1 depicts a DNS-based threat mitigation and domain access control service according to this disclosure.

TP (Threat Protection): a DNS-based threat mitigation and domain access control service built on a cloud service, such as depicted in FIG. 1.

TP resolver: a cloud-based DNS resolver as configured for the TP service.

TP client: an off-network client application that runs on a customer-managed user device to proxy DNS requests to the TP Resolver cloud-based resolves for application of TP customer policy.

User device: a customer-managed device, generally a Windows- or MacOS laptop or mobile device, where the TP client is installed.

User agent: is any application running on the user device that drives DNS requests; in an off-net mode, its requests are proxied via the TP client.

SI: a cloud security intelligence platform that consumes Internet activity records to perform threat intelligence research.

Captive portal: a system used to require Internet users to interact with a system on the local network before being allowed to access the Internet via the local network.

Transparent interception: an operation that occurs when an on-path device transparently intercepts Internet traffic; captive portals often use this method to drive user interaction with the portal.

HMAC-SHA-256: Hashed Message Authentication Code algorithm using SHA-256.

API server: An API service running on an HTTPS application attached to a key/value data store to provide configuration updates and authorization tokens to the TP client and to track TP client device registrations for support and reporting purposes.

KS: a distributed database containing tables used to provide request-processing policy for the TP resolver.

UUID: Universally Unique Identifier, as defined in RFC 4122, also known as a Globally Unique Identifier (GUID).

API authN key: A customer-specific symmetric key used to authenticate API calls.

Authorization token: A short-lived token included in DNS requests used for request authorization and to provide the device's UUID. This is also referred to as an authZ token.

authZ HMAC key: a system-wide symmetric key used to sign the authorization token.

authZ encryption key: a system-wide symmetric key used to encrypt the UUID in the authorization token.

Device name: A name used to identify a user device. Typically, this is a hostname.

As will be described, the technique herein provides for a client application to manage a resolver configuration and send DNS requests to the TP service. The client application is configured to detect network conditions and automatically configure an appropriate system-wide DNS resolution setting for various operating scenarios, e.g.: when on the customer's corporate network (including VPN), send DNS requests to the customer's corporate resolver; when off the customer's corporate network (including cases where the client is on the corporate network of a different TP customer), send DNS requests to TP; when on a network that requires use of the local DNS recursive resolver (e.g., some captive portal architectures), either fail or use the local resolver, based on the customer configuration; and when on a network that requires use of the local DNS recursive resolver only for initial network registration, switch from the local resolver to TP after registration is complete. Preferably, DNS requests from the client identify the customer and (optionally) the device to the TP resolvers without introducing a publicly-visible customer or device identifier to the DNS requests or responses. The TP system then applies the correct policy to DNS requests coming from off-network clients. In particular, the TP resolvers must recognize the customer for requests coming for off net clients and apply the customer's policy to such request. These resolvers are also configured to log the customer and (optionally) the device associated with requests from the TP off-net client. Preferably, request logs from the TP resolvers are provided to a cloud security intelligence platform for threat intelligence analytics and customer visible reporting. Also, and for enhanced security, preferably TP resolvers sign DNS responses for verification by the TP off net client application.

FIG. 1 depicts the basic system. Except for corporate resolver 108, which typically executes in the enterprise (customer) network, the portions that are shaded reflect components that preferably execute in a service provider operating environment, which environment may include cloud-based resources (hardware, appliances, virtual machines, etc.). The user device 102 (typically an enterprise-managed laptop, tablet, mobile device or the like) comprises a user agent 104, and the TP client 106 of this disclosure. As depicted, the user device 102 operates on-net, as well as potentially off-net. The user device 102 issues DNS queries directly or via corporate resolver 108 (depending on whether on-net or off-net) to the TP resolver 110, which operates DNS policy logic. In operation, the DNS policy logic matches the queried domain and resolved IP to lists that are either provided by the service provider, or by the customer. If the domain/IP is matched, an associated response will be returned instead of the normal one. One such cloud-based service is AnswerX™ (available from Akamai Technologies, Inc., of Cambridge, Massachusetts), although the techniques herein are not limited for use that commercial service. The cloud DNS system has a cloud DNS front end configured as a policy engine that executes a policy. The policy allows the resolver 110 to alter its behavior depending on who is asking the question. In one implementation, the policy leverages data tables arriving via a data source engine. Preferably, identifying bad domains/IPs is done in the cloud security intelligence platform 116, e.g., by processing query logs as well as third party feeds and external data. Identifying a bad domain in the customer logs creates an alert to the customer, typically delivered via the portal 114. Bad domains/IPs that are identified from other data sources are pushed as lists to the cloud DNS servers to mitigate when queries to those domains/IPs come from platform customers. Configuration preferably is done in the service provider portal 114 and pushed to the DNS servers to populate table entries. Customer-provided lists preferably are also pushed. Monitoring data preferably is from events, fired when a query to a bad domain/IP is detected, with processing done in SI 116 and presented in the portal 114. Monitoring preferably is near-real-time. As SI 116 needs to ingest query logs to identify bad domains/IPs, and as it provides near real-time monitoring, it also provides reporting for the overall data gathered.

The TP off-network client 106 is a DNS proxy application that runs on the enterprise-managed mobile client device 102 for the purpose of ensuring that TP policies can be applied to DNS lookups performed from outside the corporate network (i.e., "off-net"). The off network client system comprises a control plane, and a data plane. The control plane is driven primarily by the customer portal 114 and an API server 120. The data plane provides DNS request handling in the TP recursive resolver 110 with reporting capability provided by the cloud security intelligence platform 116.

The TP client request processing and reporting are now described. The TP client typically is inactive when it is running from within a registered corporate network (on-net). When on the corporate network, preferably the user device is either configured to use a recognized corporate resolver 108 that forwards requests to the TP resolver 110, or to simply use the TP resolver 110 directly from a recognized public IP address for a customer site. When the TP client 106 is active, it acts as a local proxy for DNS requests so that it can provide a customer identifier in the request, along with an internal UUID for device identification. This authorization token preferably is retrieved from a token generator application configured to execute within or in association with the cloud provider. As will be described, the token is encrypted and signed using pre-shared keys managed by a key management infrastructure 118. Details about token generation are described below in the section titled "TP Client Authorization API." Preferably, the signing key for this process is available only to the token generator, but it could be shared with other components to support token validation. Preferably, the encryption key is also available to the security intelligence platform 116 for reporting purposes (see below) and is not shared with any other system.

Upon generation, authorization tokens are pushed to the TP resolver 110 (and there may be several) as policy. As an alternative, the signing secret may be shared with the TP resolver such that the resolver can itself validate tokens without having all tokens pushed to it. When a DNS request is received, the TP resolver 110 verifies that the token is allowed by policy for the customer to whom the TP resolver address is assigned, and it then applies the customer's policy only to verified mobile users and recognized corporate sites. The still-encrypted UUID is included in the request logs delivered to the security intelligence platform 116 for threat intelligence analytics and customer reporting, and that platform preferably is able to decrypt the UUID for reporting purposes. In this manner, the TP resolver is not able to reliably identify the user, e.g., through a persistent identity. Details about request handling are described below.

Figure 2:
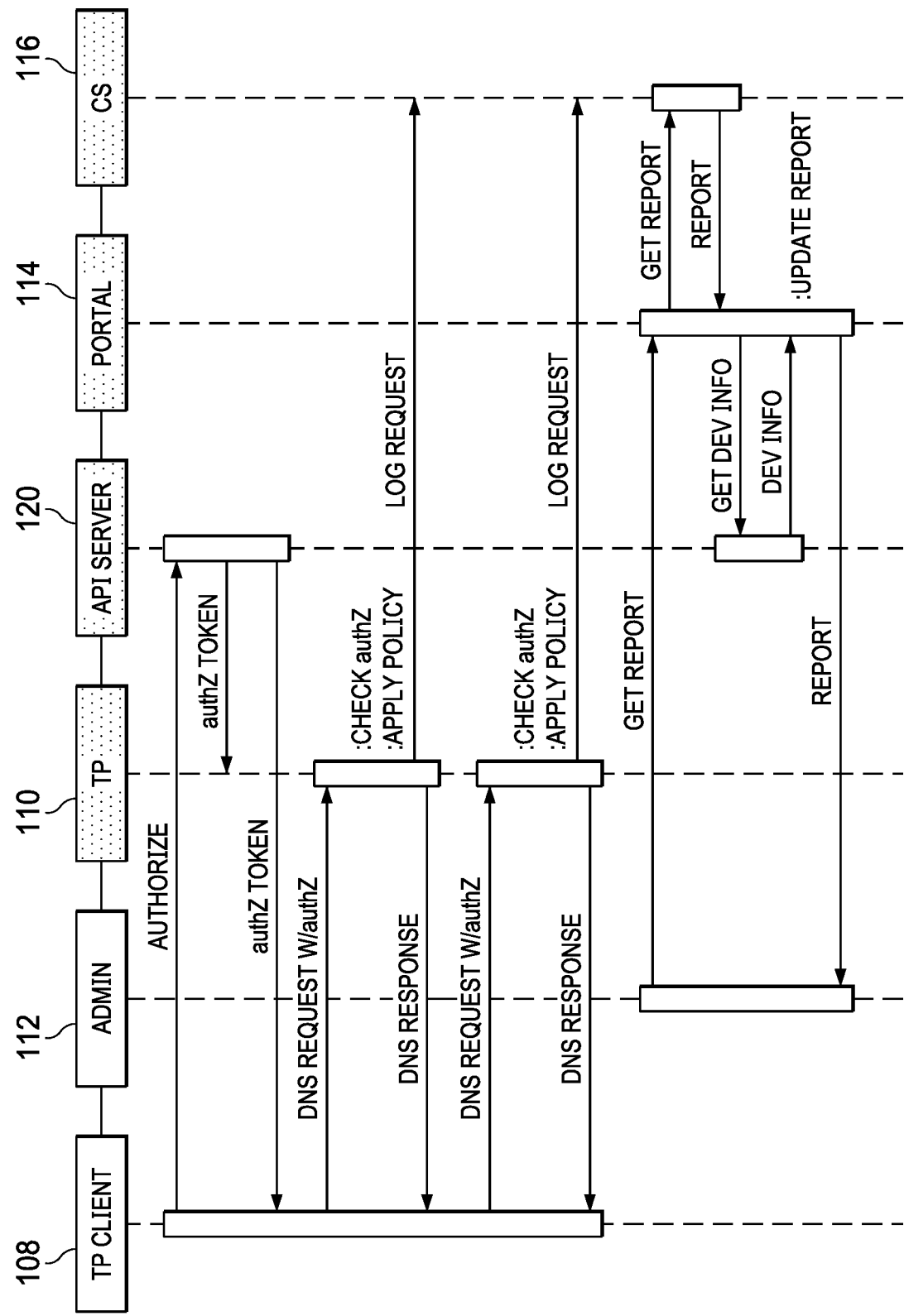
FIG. 2 depicts a sequence diagram illustrating a TP off-net client request and reporting flow according to this disclosure.

The sequence diagram in FIG. 2 illustrates the TP off-net client request and reporting flow for the identified components.

Preferably, the TP client 106 executes as a DNS proxy application that runs on the user device 102 and serves as a DNS proxy when the client is not on the customer's network. It is responsible for determining whether the TP client should be active, e.g., based on local network conditions, and for managing the user device's DNS configuration. When a DNS proxy mode is enabled by the TP client 106 application, the TP client configures itself as the default name server at the operating system level (on the device). Before forwarding requests to the TP resolver 110, the TP client 106 uses a TP Client Authorization API (described below) to retrieve an authorization token. When constructing the forward request to send to TP, the TP client preferably adds an edns (0) OPT RR containing the authorization token using a known format. Details regarding this extension are found, for example, in Internet RFC 6891. When the client receives a new authZ token, it uses an expires_in value to determine a reasonable time to ask for a new authZ token. This time period is configurable, and it is preferably adjusted as needed to mitigate against the risk of large numbers of clients being synchronized on the same update interval. Before swapping the old token for a new one, preferably the client verifies that the new token has been delivered to the TP resolver 110. A network detection mechanism may be used for this purpose. In particular, the client sends a request for the DNS test domain to the TP resolver including the new authZ token. If it receives the TP resolver's VIP as the answer, the new authZ token was accepted by the TP resolver and can now be used. If the client receives the authoritative DNS response, it waits a short interval and tries again, repeating these probes until success or the old token has expired.

More generally, and upon receiving a response from the TP resolver 110, the TP client 108 relays the response back to the client. Local response caching on the client may be used. On a dual-stack client, the TP client preferably listens on both an IPv4 localhost address and an IPv6 localhost address. Both addresses preferably are configured as available resolvers, and the TP client relies on the user agent's name resolution stack to select between the addresses in the same way that it would if the TP resolver's direct IPv4 and IPv6 addresses were both configured as options. Requests that arrive on the IPv4 localhost address are sent to the TP resolver using its IPv4 address, while IPv6 localhost requests are sent to the TP resolver's IPv6 address.

The following provides details regarding the TP resolver 110.

If a DNS request contains an edns (0) device identifier ("device ID" or "device id") value (see TP Client Authorization API below), the TP resolver 110 validates the device ID according to policy that has been pushed (e.g., via the KS distributed database) to the resolver from the API server 120. If the request is authorized, customer policy is applied to the DNS request and an appropriate response is delivered. If the request is not authorized based on the device ID value, the TP resolver treats the request as if the device ID had not been provided. If the site is recognized, customer policy is applied. If the site is not recognized, the TP resolver simply goes forward to the authoritative resolver for the request and relays the resulting response back to the client. Preferably, the device ID value is only included in the DNS request logs if it passed the validation checks.

The TP resolver 110 also preferably is configured to recognize the customer-specific DNS test domain when a request arrives on the correct address for the customer. If either the source address of the request matches one of the customer's configured sites or there is a valid authorization token in the edns (0) device ID value, the TP resolver 110 preferably responds directly to the request, e.g., providing the customer's TP resolver address (e.g., an anycast VIP) as the answer, which indicates to the TP client that network conditions allowed the TP resolver to respond. If neither the source address is recognized nor a valid authorization token is provided, then preferably no special handling is applied to the DNS test domain. The request is simply relayed forward to the authoritative resolver for the domain. This should result in an answer that is different from the address of the recursive resolver, indicating to the TP client that the TP resolver is either not in the request flow or not configured to allow policy to be applied to the client's requests.

When a valid authorization token is provided in the edns (0) device ID field for a request, the device ID value is included in the request log. Preferably, the TP resolver does not receive the encryption keys used for the UUID, so it never has access to the UUID itself. Also, preferably the TP resolver cannot even determine whether a real UUID was provided in the request. For this reason, preferably every TP client request is logged with an encrypted_uuid value, regardless of whether or not it actually contains a device-specific uuid value.

TP Client API Service

As noted, the TP client API service preferably is an HTTPS application attached to a key/value data store on its back end. The purpose of the service is to provide registration, authN/authZ, and configuration distribution capabilities to user devices where the TP client DNS proxy application is installed. The APIs provided in one embodiment of the client are as follows: TP client registration-allows a user device to register with the provider, initializing a UUID and HMAC-SHA-256 key for use by the other APIs; TP client authorization-allows a registered user device to receive an authorization token for use in DNS requests; TP client configuration-allows a registered user device to receive customer configuration updates; and TP client key rotation-allows a registered user device to update its copy of the customer-specific HMAC-SHA-256 key. Each of these are described below.

TP Client Registration API

The purpose of the TP client registration API is to require user devices to register with the platform to be authorized for access to the TP service as described herein. Although device registration need not be explicitly approved by the customer administrator 112, this registration step does allow the customer administrator to audit the list of registered devices for problems (e.g., to identify device UUID conflicts, out-of-date software, etc.), and to associate DNS requests with individual user devices if device identification is enabled.

TP client registration API requests are formed as depicted in FIG. 3. In this example, the user_id value is a freeform string provided by the customer administrator 112, typically via a replacement value in the installation script. The value is used for report generation purposes. The user id is usually a username or e-mail address, but it could be any value that is meaningful to the customer administrator in reports. Note that the user_id attribute is optional; all other attributes are required. Upon receipt, the custid, software version, and entitlement code are verified against customer information stored in the key/value data store. If the request fails verification, the API server responds with 401 Unauthorized. If the request passes verification but the source address associated with the API request is not associated with a configured customer site, the API server responds with 403 Forbidden. If the request passes both checks, the API server generates a UUID for the device. The device name, MAC address (or other hardware-based device identifier), and optional user ID are stored encrypted in the key/value data store using a KMI managed key. The API server responds with the response shown in FIG. 4. In this example, the key id value is provided in future requests to identify the key used for request signing. The key type is used locally to drive the expected algorithm for key signing. The key preferably is client-specific and derived from the current active authentication key for the customer. The customer key is managed and used for request authentication as described in the following section.

Preferably, the device name, MAC address (or other hardware identifier), and user ID are reserved for customer-visible reporting and not made available to other systems.

TP Client API Request Authentication

In one embodiment, TP client APIs use HMAC-SHA-256 to generate a client authentication signature, with the exception of the above described TP client registration API that is used to bootstrap the application.

Preferably, API requests include at least the following attributes: customer_id: the customer ID, delivered to the client as part of the bootstrapping configuration; device_id: the UUID value assigned to the user device during bootstrapping; software_version: the version of the TP client software currently installed on the user device; config_version: the version of the TP client configuration currently in use on the user device; and key_id: the identifier for the key used to sign the request; nonce: a random number selected for this request to provide entropy to mitigate against brute force attacks to discover the signing key; icv: the HMAC-SHA-256 signature for this request. Other additional attributes may be included.

To generate the HMAC-SHA-256 signature, preferably the TP client constructs the URI for the request with all attributes except the icv attribute. For example, for the authorization API, the TP client constructs the string depicted in FIG. 5. An HMAC signature is generated over the resulting data block using the client's current key. The icv attribute is then appended to the request string. The icv attribute is the last attribute in the request URI. When the TP client API server receives a request, it strips the icv attribute from the request URI, pads with NULL bytes if necessary, and generates its own signature using the API authN key stored in the key/value data store for the identified custid. If the locally generated HMAC value does not match the HMAC value presented in the request's icv attribute, the server responds with 400 Bad Request. A client that has been determined to be compromised can be blacklisted by the TP client API service. In that case, any client request providing a blacklisted device_id value receives 403 Forbidden.

Customer API AuthN Key Management

The TPcustomer's API authN key preferably is managed and distributed via KMI. When a new TP customer is enabled for off-net client support, a new customer key is added to the collection and distributed before user devices can be registered. Alternatively, the actual customer API authN keys are dynamically generated and managed by the API server, which protects them in storage, e.g., using a KMI-managed service-wide key. Per-customer API authN keys preferably are rotated periodically, and user devices preferably only receive a client-specific key derived from the per-customer key.

The API authN key delivered to the client preferably is derived from the client's UUID using a key derivation function (KDF) appropriate for the signing algorithm and the customer-specific API authN key. HMAC-SHA256 may be used for signing, so HMAC-based key derivation is used (RFC5869).

For any API other than the key rotation API, preferably only a key derived from the current key may be used to sign the request. The key rotation API is allowed and may be authenticated with any unexpired key. After the key expiration interval, the client application must be re-bootstrapped with a fresh install if it has not completed rotation to an unexpired key. TP client authorization API As noted above, the TP resolver preferably does not apply customer policy to requests from unrecognized sites unless the request contains a valid authorization token. To obtain an authorization token, the client uses the authorization API. A representative authorization API request is structured as depicted as shown in FIG. 6. After validating the request, the TP client API server generates an authorization token. Authorization tokens are structured as shown in FIG. 7. The token_format value indicates a version for the token_format. The unused field is set to NULL and is reserved for future use. The kid and timestamp values, as well as key management for generation of the token, are discussed below. The custid field provides the customer identifier associated with the TP configuration. The cypher_block contains a cleartext initialization vector (iv) and an ecrypted_uuid. The iv is used as input to the algorithm used for encrypting the uuid. The iv is populated with a cryptographically random value generated by the API server during authZ token generation. Its purpose is to provide a significant source of entropy for the encrypted_uuid to mitigate brute force attacks against the authZ token's encryption key. The size of the iv is associated with the encryption algorithm which is in turn associated with the enc_kid value. An encrypted_uuid preferably is provided in the authZ token, whether or not the customer's configuration disables device identification in the request logs. This is done to limit an external adversary's ability to determine whether or not the device is actually identified in the request. Preferably, the token is structured with the kids, timestamp, lifetime, and custid in the clear to allow an intermediate system to validate the authorization token without requiring it to have access to the decryption key for the encrypted_uuid. This does not require the TP resolver to dynamically validate the authorization token, although such validation may be done as described below. As noted, the TP resolver preferably does not share the encryption key and so does not access the device's UUID in the clear. The hmac field contains the HMAC-SHA256-128 signature for the whole token structure. To generate the signature, preferably the fields are first populated with their respective values and the hmac field is initialized with NULL bytes. An HMAC-SHA256 signature is generated and some number of bits are then stored as the hmac value.

The API server's response is structured as a JSON object, such as depicted in FIG. 8. Preferably, the "auth_token" value populates the edns (0) device ID field in the TP client's DNS requests. The "expires_in" value indicates to the client the lifetime of the token, thereby allowing the TP client to determine how long to wait before requesting a new token.

AuthZ token key management

The encryption and HMAC keys used for authorization token generation (the authZ encryption key and authZ HMAC key) preferably are distributed via KMI. It is not required that the authZ HMAC keys to be shared by multiple systems, though an alternative authZ token validation model would require the TP resolver and the HTTPS application to share this secret. The HMAC algorithm and the size of the token's HMAC field are associated with the authZ HMAC key secret definition. It is not required the authZ encryption keys be shared between the HTTPS application and the cloud security intelligence platform. Preferably, the authZ token keys have a default rotation interval. Although there is no requirement for dynamic authZ token validation, another embodiment implements an alternative model wherein timestamp is used to protect against replay attacks.

AuthZ Token Policy Management

As noted above, it is not required to implement dynamic HMAC validation for authZ tokens on the TP resolver. Instead, authZ tokens preferably are pushed to the TP resolver as policy, e.g., using KS. Token validation is handled on the TP resolver in the manner described below. When a new authZ token is generated, the API server preferably publishes a new table row to KS. The correctness of token validation typically is dependent upon KS's distribution of authZ tokens across the public Internet.

TP Client Configuration API

As noted above, the TP client periodically polls for configuration updates at a configurable interval with a randomized offset to mitigate against request spikes. A representative configuration API request is structured as shown in FIG. 9. After validating the request, the TP client API server check the current configuration version against the existing customer configuration, e.g., stored in the key/value data store. If the configuration version in the request is the same as the configuration version stored, the API server preferably responds with 304 Not Modified. If, however, there is a new configuration version available, the API server's response is structured as a JSON object such as depicted in FIG. 10.

TP Client Key Rotation API

As noted above, the TP client periodically rotates its authentication key. When the client is on-net and uses an inactive key for either the authorization or configuration APIs, it receives a 401 Unauthorized response. When this occurs, the client attempts to update its locally-stored authentication key by using the key rotation API. A representative key rotation API request is structured as shown in FIG. 11. After validating the request, the TP client API server checks the kid presented by the client against the kid for the current customer-specific authentication key. If the kid in the request matches the kid for the current key, the server sends 304 Not Modified. If, however, there is a new key available, the API server sends a 200 Success response, providing the new key structured as a JSON object. A representative response is shown in FIG. 12. Use of the customer key thus requires both the key and a valid device UUID value.

According to the technique described above, a mobile device being managed by the enterprise is registered for off-net access. Registration products the unique device identifier (UUID) and provides a method for the reporting system to associate the UUID with machine and user identity.

Enabling Technologies

Figure 13:
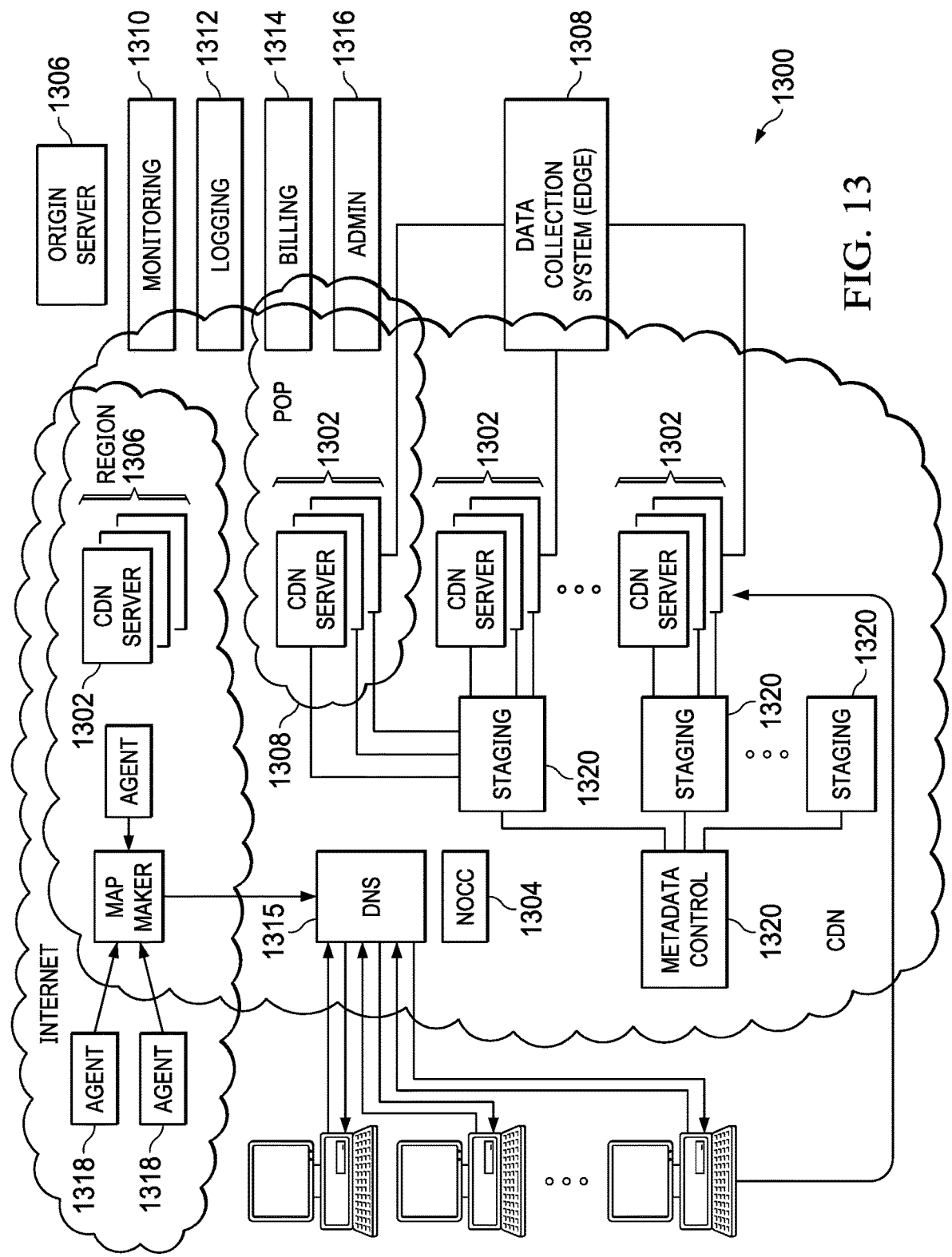
FIG. 13 is a block diagram illustrating a known distributed computer system configured as a content delivery network (CDN)

The techniques of this disclosure may be implemented within the context of an overlay network, such as a content delivery network (CDN), although this is not a limitation. In a known system of this type, such as shown in FIG. 13, a distributed computer system 1300 is configured as a content delivery network (CDN) and is assumed to have a set of machines 1302a-n distributed around the Internet. Typically, most of the machines are servers located near the edge of the Internet, i.e., at or adjacent end user access networks. A network operations command center (NOCC) 1304 manages operations of the various machines in the system. Third party sites, such as web site 1306, offload delivery of content (e.g., HTML, embedded page objects, streaming media, software downloads, and the like) to the distributed computer system 1300 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 1310, 1312, 1314 and 1316 to facilitate monitoring, logging, alerts, billing, management and other operational and administrative functions. Distributed network agents 1318 monitor the network as well as the server loads and provide network, traffic and load data to a DNS query handling mechanism 1315, which is authoritative for content domains being managed by the CDN. A distributed data transport mechanism 1320 may be used to distribute control information (e.g., metadata to manage content, to facilitate load balancing, and the like) to the edge servers.

Figure 14:
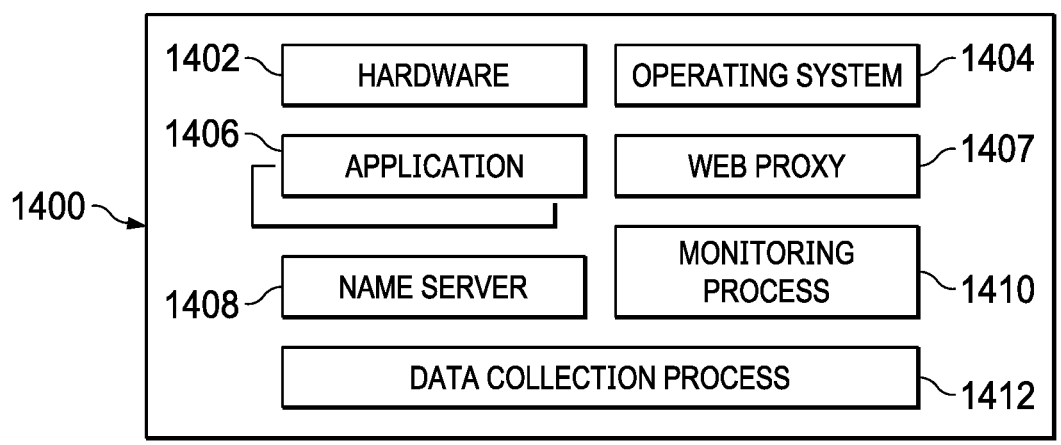
FIG. 14 is a representative CDN edge machine configuration.

As illustrated in FIG. 14, a given machine 1400 comprises commodity hardware (e.g., an Intel Pentium processor) 1402 running an operating system kernel (such as Linux or variant) 1404 that supports one or more applications 1406*a-n*. To facilitate content delivery services, for example, given machines typically run a set of applications, such as an HTTP proxy 1407 (sometimes referred to as a "global host" process), a name server 1408, a local monitoring process 1410, a distributed data collection process 1412, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

There is no limitation on the type of machine or computing entity that may implement the conduit entity and its related function herein. Any computing entity (system, machine, device, program, process, utility, or the like) may act as the client or the server. There is no limitation on the type of computing entity that may implement the function. The function may be implemented within or in association with other systems, equipment and facilities.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The invention claimed is:

1. A method to enable a client device associated with an enterprise network to obtain access to an enterprise resource, comprising:

configuring a recursive Domain Name System (DNS) service, the recursive DNS service including a resolver associated with the enterprise;

configuring the client device to act as a local proxy for off enterprise network DNS requests;

receiving at the resolver a DNS query from the client device, the client device having determined it is operating off of the enterprise network, the DNS query having been extended using an edns (0) extension to encode an authorization token, the authorization token including a unique device identifier associated with the client device and an identifier associated with the enterprise, the unique device identifier having been encrypted and digitally-signed with a key to generate the authorization token, the identifier associated with the enterprise being unencrypted;

determining at the resolver, but without access to the unique device identifier encoded in the authorization token, whether the authorization token is allowed for the enterprise, wherein a determination is based at least in part on the identifier associated with the enterprise and a threat protection policy; and upon a determination that the authorization token is allowed, returning a response to the DNS query, wherein the response to the DNS query is based on applying the threat protection policy to the DNS query.

2. The method as described in claim 1, further including performing a registration of the client device, wherein the authorization token is provided to the client device during the registration.

3. The method as described in claim 1 wherein the authorization token is updated after a given time period.

4. The method as described in claim 1 wherein the resolver executes in association with an overlay network.

5. The method as described in claim 1 wherein the client device is one of: a laptop, a mobile phone, a tablet, and a network-accessible device.

6. The method as described in claim 1 further including using the unique device identifier for one of: reporting, and analytics.

7. A computer program product in a non-transitory computer-readable medium of a mobile device, the mobile device comprising a hardware processor, the computer program product comprising computer program instructions executable by the hardware processor, the computer program instructions comprising:

a DNS proxy;

code that determines whether the mobile device is operating off an enterprise network;

code, responsive to a determination that the mobile device is operating off the enterprise network, to issue a DNS query from the DNS proxy to a resolver, the resolver operating as a recursive Domain Name System (DNS) service on behalf of the enterprise, the DNS query having been extended using an edns (0) extension to encode an authorization token, the authorization token including a unique device identifier associated with the mobile device and an identifier associated with the enterprise, the unique device identifier having been encrypted and digitally-signed with a key to generate the authorization token, the identifier associated with the enterprise being unencrypted; and code receiving a response to the DNS query, the response having been generated at the resolver upon a determination at the resolver that the authorization code is allowed for the enterprise, the determination having been carried out by the resolver using the identifier associated with the enterprise and without access to the unique device identifier encoded in the authentication token, together with application by the resolver of a threat protection policy associated with the enterprise.

8. The computer program product as described in claim 7 wherein the computer program instructions further include code that registers the mobile device for off-net access to the resolver, wherein the unique device identifier is generated in response to registration of the mobile device.

9. The computer program product as described in claim 7 wherein the computer program instructions further include code that requests an updated authorization token after a given time period.

10. A system comprising one or more computing machines that include computer hardware, comprising:

a recursive resolver executing on a computer machine and providing a recursive Domain Name System (DNS) service;

a mobile device client application that instantiates a DNS proxy on a mobile device, the client application including code to determine whether the mobile device is operating off-net with respect to a protected enterprise network, code responsive to a determination that the mobile device is executing off-net to issue a DNS query from the DNS proxy to the recursive resolver, the DNS query having been extended using an edns (0) extension to encode an authorization token, the authentication token including a unique device identifier associated with the mobile device and an identifier associated with the enterprise, the unique device identifier having been encrypted and digitally-signed with a key to generate the authorization token, the identifier associated with the enterprise being unencrypted;

wherein the recursive resolver receives the DNS query and, without access to the unique device identifier encoded in the authorization token, determines whether the authorization token is allowed for the enterprise, wherein the determination is based at least in part on the identifier associated with the enterprise and a threat protection policy for the enterprise; and the recursive resolver further operative upon a determination that the authorization token is allowed, to return to the mobile device client application a response to the DNS query, wherein the response to the DNS query is based on applying the threat protection policy to the DNS query.

* * * * *